US008207639B2

United States Patent
Horng

(10) Patent No.: US 8,207,639 B2
(45) Date of Patent: Jun. 26, 2012

(54) MOTOR AND HEATING DISSIPATING FAN INCLUDING MOTOR HAVING AN ANNULAR BALANCING MEMBER

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 274 days.

(21) Appl. No.: 12/604,472

(22) Filed: Oct. 23, 2009

(65) Prior Publication Data

US 2011/0097221 A1 Apr. 28, 2011

(51) Int. Cl.
*H02K 7/04* (2006.01)
*F04D 29/041* (2006.01)
*F04D 19/00* (2006.01)

(52) U.S. Cl. ......... 310/51; 310/67 R; 310/90.5; 417/354

(58) Field of Classification Search .................. 417/353, 417/354, 423.7; 310/51, 67 R, 156.04, 90.5, 310/190
See application file for complete search history.

(56) References Cited

U.S. PATENT DOCUMENTS

| | | | | |
|---|---|---|---|---|
| 6,097,120 | A * | 8/2000 | Horng | 310/90.5 |
| 6,462,443 | B2 * | 10/2002 | Horng | 310/68 B |
| 6,612,814 | B2 * | 9/2003 | Shih et al. | 417/354 |
| 7,030,527 | B2 | 4/2006 | Tsuda et al. | |
| 7,038,341 | B1 * | 5/2006 | Wang et al. | 310/90.5 |
| 7,265,464 | B2 * | 9/2007 | Chen | 310/68 B |
| 7,271,518 | B2 * | 9/2007 | Horng et al. | 310/190 |
| 2005/0006962 | A1 * | 1/2005 | Horng | 310/51 |

FOREIGN PATENT DOCUMENTS

| | | |
|---|---|---|
| TW | 421369 | 4/1988 |
| TW | 501823 | 3/1990 |
| TW | 590330 | 9/1991 |
| TW | M243848 | 7/1992 |
| TW | I246817 | 2/1993 |
| TW | I256440 | 4/1993 |
| TW | I257757 | 1/1994 |
| TW | 200638658 | 4/1994 |

OTHER PUBLICATIONS

English Abstract of CN201218215Y having a publication date of Apr. 8, 2009.*

* cited by examiner

*Primary Examiner* — Devon C Kramer
*Assistant Examiner* — Nathan Zollinger
(74) *Attorney, Agent, or Firm* — Alan Kamrath; Kamrath IP Lawfirm, PA

(57) ABSTRACT

A motor includes a balancing member having a surface, a shaft coupling portion and a magnetically conductive portion. A stator is coupled to the balancing member. A rotor includes a hub, a shaft, and a permanent magnet. The shaft and the permanent magnet are mounted inside the hub. The shaft is rotatably coupled to the shaft coupling portion. The permanent magnet includes a magnetically attracting face aligned with the magnetically conductive portion of the balancing member. The magnetically attracting face and the magnetically conductive portion attract each other to maintain stable rotation of the rotor while providing a simplified structure. The balancing member can be interconnected to a housing, and the hub can include a plurality of blades to form a heat dissipating fan. When the rotor rotates, air currents are drawn by the blades to a heat source for heat dissipating purposes.

4 Claims, 10 Drawing Sheets

MOTOR AND HEATING DISSIPATING FAN INCLUDING MOTOR HAVING AN ANNULAR BALANCING MEMBER

BACKGROUND OF THE INVENTION

1. Field of the Invention

The present invention relates to a motor and, more particularly, to a motor having a balancing plate. The present invention also relates to a heat dissipating fan including such a motor.

2. Description of the Related Art

Conventional heat dissipating fans generally include a motor driving an impeller to rotate for heat dissipating purposes. A typical motor includes a base or a substrate, a stator, and a rotor. The base supports the stator and the rotor. The stator is coupled to the base, and the rotor is rotatably coupled to the stator and can be driven to rotate by the stator. In order to provide stable rotation of the rotor, it is usual to mount a balancing magnet, a balancing ring, a balancing plate, or the like to the base or substrate.

FIG. 1 shows a conventional motor 5 including a base 51 on which a shaft tube 52 is formed and located in a center of a stator 56. A rotor 53 includes a hub 531 and a shaft 532 extending from the hub 531 and rotatably received in the shaft tube 52. A balancing magnet 54 is mounted in a top end of the shaft tube 52. A magnetically conductive portion 55 is mounted to the hub 531 and aligned with the balancing magnet 54. Stable rotation of the rotor 53 and stable starting can be obtained by the balancing magnet 54 that magnetically attracts the magnetically conductive portion 55. An example of such a motor 5 is disclosed in Taiwan Patent No. I2564440. However, mounting of the balancing magnet 54 in the top end of the shaft tube 52 and mounting of the magnetically conductive portion 55 to the hub 531 are troublesome and result in an increase in the number of the elements and hence, the costs of the motor 5. Furthermore, a spacing is required between the magnetically conductive portion 55 and the balancing magnet 54 such that the overall axial length of the motor 5 can not be effectively reduced.

FIG. 2 shows another conventional motor 6 including a stator 61, a balancing magnet 62, a rotor 63, and a metal casing 64. The balancing magnet 62 is mounted to the stator 61. The rotor 63 includes a permanent magnet 631 aligned with the stator 61. The metal casing 64 is mounted to an inner side of the rotor 63. The balancing magnet 62 and the metal casing 64 provide a magnetic balancing force therebetween to maintain stable rotation of the rotor 63. An example of such a motor 6 is disclosed in Taiwan Patent Publication No. 590330. However, mounting of the metal casing 64 in the rotor 63 is difficult. Furthermore, the balancing magnet 62 has to be mounted to the stator 61. Thus, the assembly of the motor 6 is not easy while having the disadvantages of many elements and high manufacturing costs. Further, a spacing is required between the rotor 63 and the stator 61 for receiving the metal casing 64 and the balancing magnet 62. As a result, the overall axial length of the motor 6 can not be effectively reduced.

FIG. 3 shows a further conventional motor 7 including a base 71, a first balancing magnet 72, a rotor 73, and a second balancing magnet 74. The base 71 supports a stator 711 to which the rotor 73 is rotatably coupled. The first balancing magnet 72 is coupled to the base 71. The second balancing magnet 74 is coupled to the rotor 73 and aligned with the first balancing magnet 72. The first and second balancing magnets 72 and 74 are spaced in an axial direction and attract each other to maintain rotational balance of the rotor 73. An example of such a motor 7 is disclosed in Taiwan Patent No. 1257757. However, mounting of the first and second balancing magnets 72 and 74 on the base 71 and the rotor 73, respectively, is troublesome while having a complicated structure and high manufacturing costs. Furthermore, the second balancing magnet 74 is liable to disengage from the rotor 73 when the rotor 73 rotates for a long period of time. Further, the first balancing magnet 72 on the base 71 inhibits reduction in the overall axial length of the motor 7.

FIG. 4 shows still another conventional motor 8 including a substrate 81, a stator 82 coupled to the substrate 81, and a rotor 83 rotatably coupled to the stator 82. The rotor 83 includes a permanent magnet 831. A balancing ring 84 is coupled to the substrate 81 and includes an annular wall 841. The annular wall 841 of the balancing ring 84 and a bottom section of the permanent magnet 831 attract each other to maintain rotational balance of the rotor 83. An example of such a motor 8 is disclosed in Taiwan Patent Publication No. 501823. However, the balancing ring 84 having the upright annular wall 841 renders a complicated structure that can not be formed easily and increases the overall axial length of the motor 8. Furthermore, mounting of the balancing ring 84 to the substrate 81 is not easy.

Conclusively, the above-mentioned motors 5, 6, 7, and 8 suffer from the disadvantages of complicated structure, inconvenient assembly, difficulties in reduction of the overall axial length, and high manufacturing costs. Other conventional structures, such as those disclosed in Taiwan Patent Publication No. 200638658, Taiwan Patent No. I246817, and Taiwan Utility Model No. M243848, also suffer from the same disadvantages. Taiwan Patent Publication No. 421369 discloses a brushless DC motor including a rotor and a stator having a plurality of magnetic pole plates, and one of which provides the balancing function for the rotor. However, manufacture and assembly of the stator are very difficult.

SUMMARY OF THE INVENTION

An objective of the present invention is to provide a motor having a simplified structure while providing rotational balance for the rotor.

Another objective of the present invention is to provide a motor and a heat dissipating fan including the motor allowing easy assembly.

A further objective of the present invention is to provide a motor and a heat dissipating fan including the motor allowing effective reduction in an overall axial length.

Still another objective of the present invention is to provide a motor and a heat dissipating fan including the motor allowing manufacture at low costs.

According to a first aspect of the present invention, a motor includes a balancing member having a surface. The balancing member has a shaft coupling portion and a magnetically conductive portion. A stator is coupled to the balancing member. A rotor includes a hub, a shaft, and a permanent magnet. The shaft and the permanent magnet are mounted inside the hub. The shaft is rotatably coupled to the shaft coupling portion. The permanent magnet includes a magnetically attracting face aligned with the magnetically conductive portion of the balancing member.

According to a second aspect of the present invention, a motor includes a balancing member having a circuit board and a ring coupled to an outer periphery of the circuit board. Each of the circuit board and the ring has a surface. The balancing member has a shaft coupling portion. The surface of the ring is a magnetically conductive portion. A stator is coupled to the balancing member and electrically connected to the circuit board. A rotor includes a hub, a shaft, and a permanent magnet. The shaft and the permanent magnet are mounted inside the hub. The shaft is rotatably coupled to the shaft coupling portion. The permanent magnet includes a magnetically attracting face aligned with the magnetically conductive portion of the ring.

According to a third aspect of the present invention, a heat dissipating fan includes a housing having an air inlet and an air outlet. A balancing member is located in the housing and interconnected by a plurality of connecting members to the housing. The balancing member includes a surface. The balancing member has a shaft coupling portion and a magnetically conductive portion. A stator is coupled to the balancing member. A rotor includes a hub, a shaft, and a permanent magnet. A plurality of blades extends outward from the hub. The shaft and the permanent magnet are mounted inside the hub. The shaft is rotatably coupled to the shaft coupling portion. The permanent magnet includes a magnetically attracting face aligned with the magnetically conductive portion of the balancing member.

According to a fourth aspect of the present invention, a heat dissipating fan includes a housing having an air inlet and an air outlet. A balancing member is located in the housing and interconnected by a plurality of connecting members to the housing. The balancing member includes a circuit board and a ring coupled to an outer periphery of the circuit board. Each of the circuit board and the ring has a surface. The balancing member has a shaft coupling portion, and the surface of the ring is a magnetically conductive portion. A stator is coupled to the balancing member and electrically connected to the circuit board. A rotor includes a hub, a shaft, and a permanent magnet. A plurality of blades extends outward from the hub. The shaft and the permanent magnet are mounted inside the hub. The shaft is rotatably coupled to the shaft coupling portion. The permanent magnet includes a magnetically attracting face aligned with the magnetically conductive portion of the ring.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
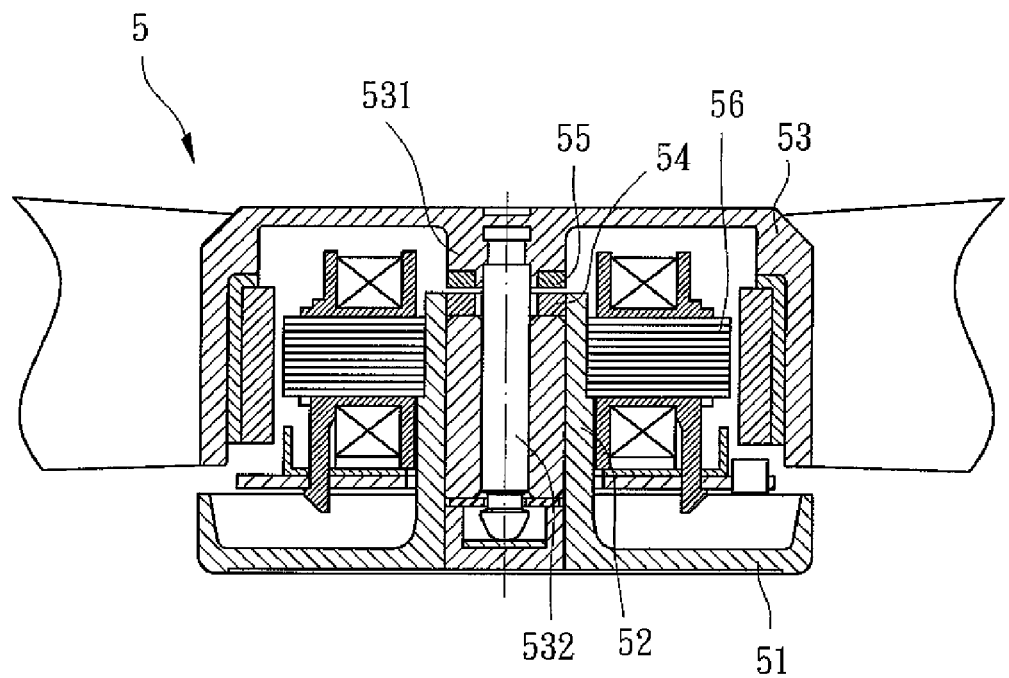
FIG. 1 shows a partial, cross sectional view of a conventional motor.
Figure 2:
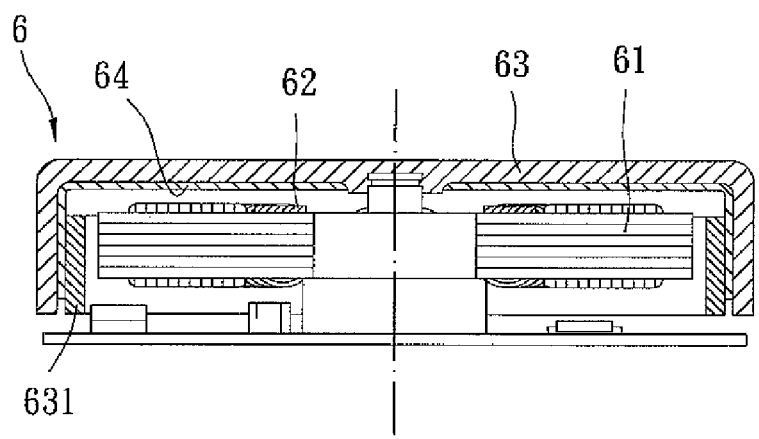
FIG. 2 shows a cross sectional view of another conventional motor.
Figure 3:
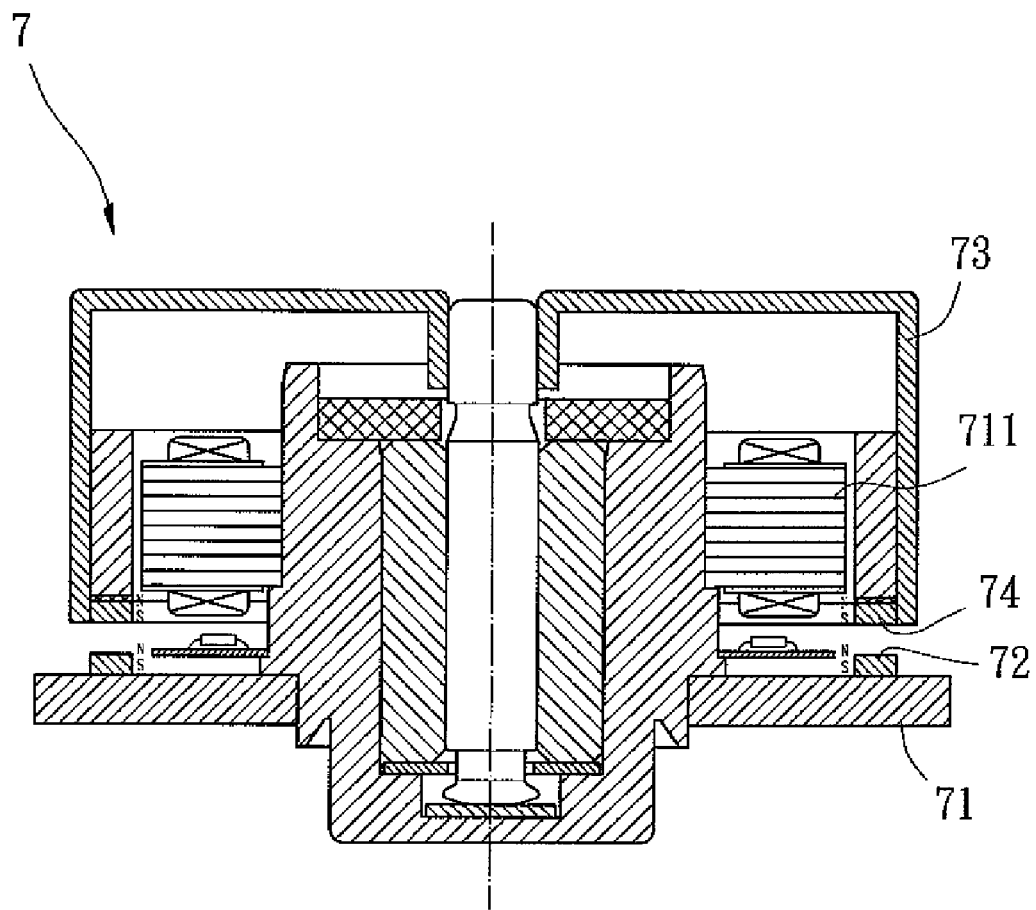
FIG. 3 shows a cross sectional view of a further conventional motor.
Figure 4:
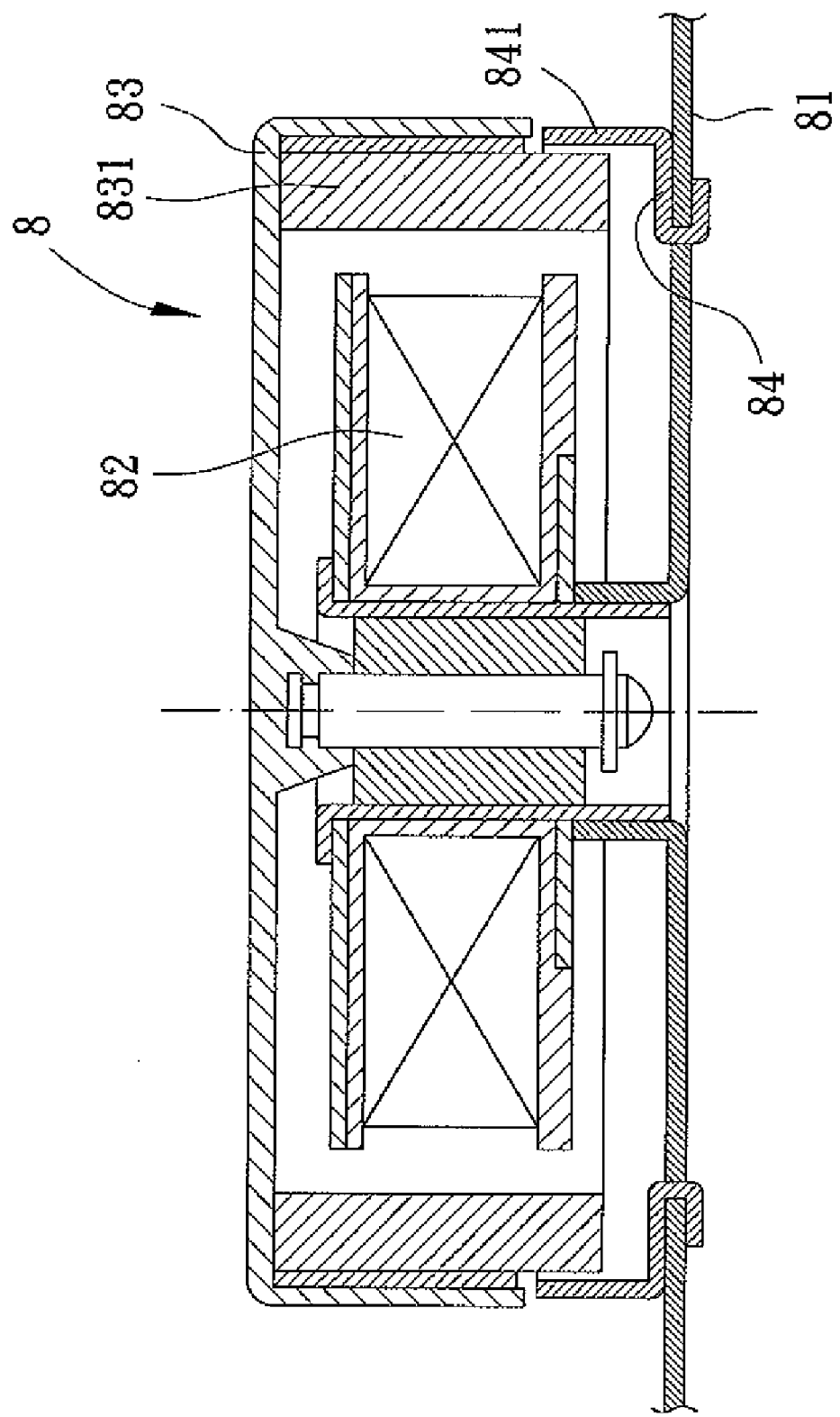
FIG. 4 shows a cross sectional view of still another conventional motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "inner", "outer", "end", "portion", "axial", "radial", "annular", "outward", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 5:
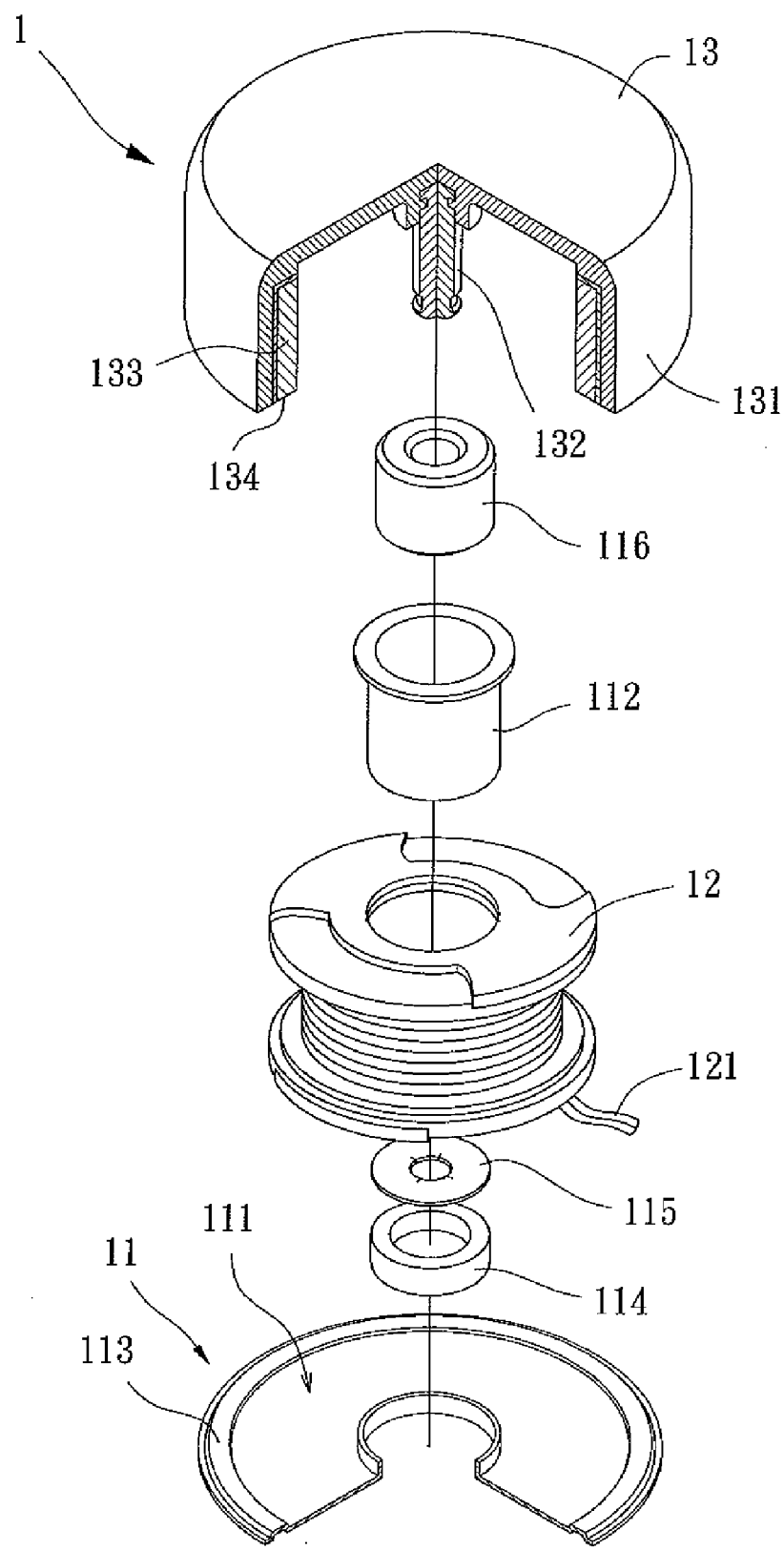
FIG. 5 shows an exploded, perspective view of a motor of a first embodiment according to the preferred teachings of the present invention with portions cut away.
Figure 6:
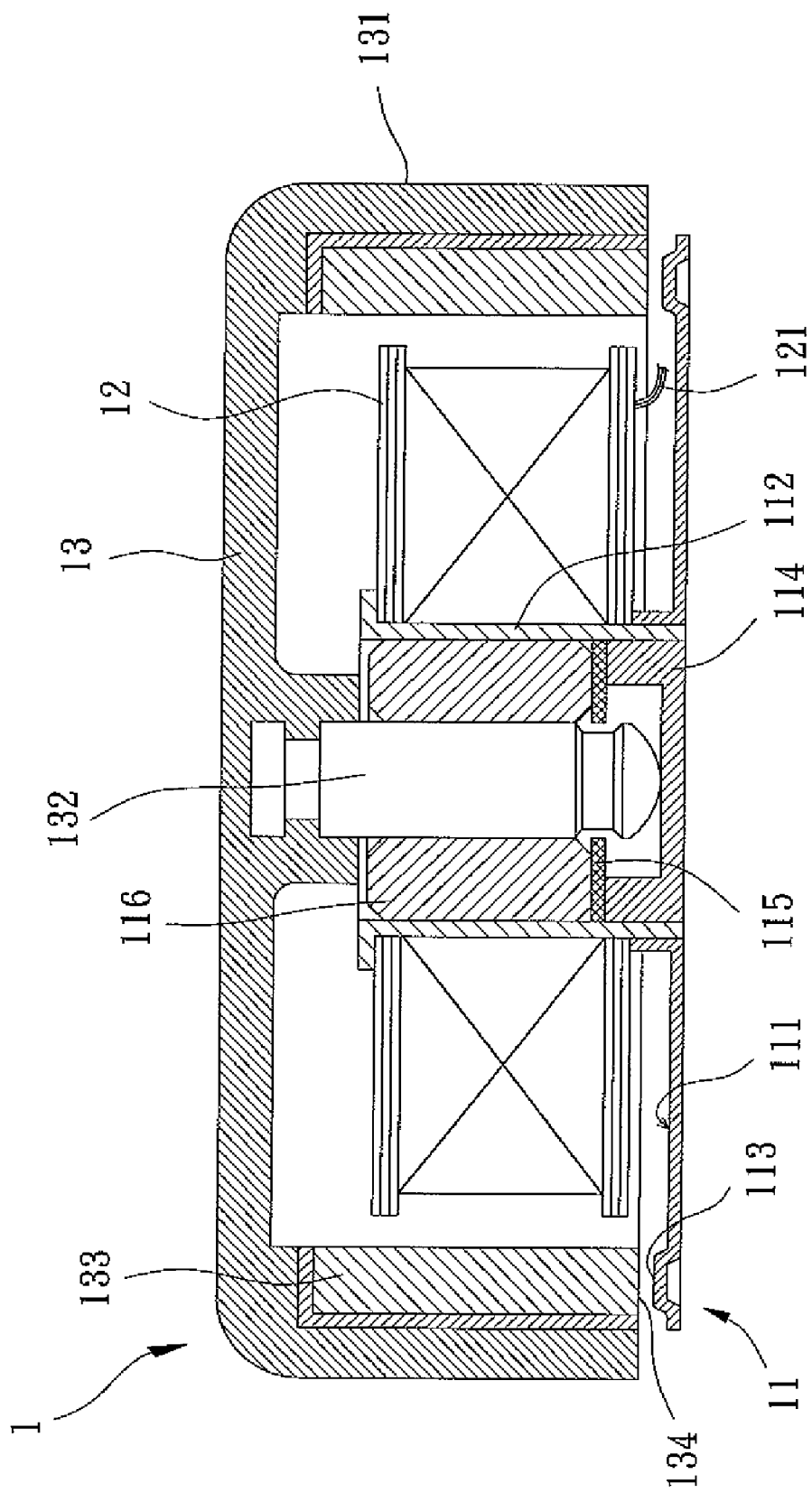
FIG. 6 shows a cross sectional view of the motor of FIG. 5.

A motor 1 of a first embodiment according to the preferred teachings of the present invention is shown in FIGS. 5 and 6. The motor 1 includes a balancing member 11, a stator 12, and a rotor 13. The balancing member 11 supports the stator 12 and the rotor 13. The stator 12 is coupled to the balancing member 11. The rotor 13 is rotatably coupled to the stator 12. The stator 12 can drive the rotor 13 to rotate, and the balancing member 11 maintains stable rotation of the rotor 13.

Specifically, the balancing member 11 includes a surface 111, a shaft coupling portion 112 and a magnetically conductive portion 113. The shaft coupling portion 112 can be integrally formed with the surface 111 as a single continuous monolithic piece or coupled to the surface 111 by any suitable provisions. The shaft coupling portion 112 can be a shaft tube, a shaft seat, or any member or structure to which the rotor 13 can be rotatably coupled. In the first embodiment, the shaft coupling portion 112 is in the form of a shaft tube receiving an abrasion-resistant plate 114, a retaining plate 115, and a bearing 116. The magnetically conductive portion 113 is an annular ring protruding from the surface 111 of the balancing member 11.

The stator 12 is coupled to the balancing member 11, as mentioned above. In the first embodiment, the stator 12 is coupled to an outer periphery of the shaft coupling portion 112.

The rotor 13 includes a hub 131, a shaft 132, and a permanent magnet 133. The shaft 132 and the permanent magnet 133 are mounted inside the hub 131. The shaft 132 is rotatably coupled to the shaft coupling portion 112 of the balancing member 11. An air gap is formed between the permanent magnet 133 and the stator 12. Furthermore, the permanent magnet 133 includes a magnetically attracting face 134 facing the surface 111 of the balancing member 11. Specifically, the magnetically attracting face 134 is aligned with the magnetically conductive portion 113 of the balancing member 11.

In use of the motor 1 according to the preferred teachings of the present invention, the stator 12 can include a wire 121 connected to a circuit board. The circuit board can be directly coupled to the balancing member 11 or mounted outside of the motor 1. Thus, the axial length of the motor 1 is not increased even if a circuit board is coupled to the balancing member 11. The circuit board activates the stator 12 to create an alternating magnetic field that interacts with the permanent magnet 133 through the air gap, driving the rotor 13 to rotate about the shaft coupling portion 112.

More specifically, the balancing member 11 is a member such that the balancing member 11 and the permanent magnet 133 can attract each other. The balancing member 11 can be a magnet, a metal plate, etc. Thus, the magnetically conductive portion 113 of the balancing member 11 and the magnetically attracting face 134 can always attract each other in the axial direction no matter whether the motor 1 according to the preferred teachings of the present invention is operating, resting, or starting. As a result, the rotational balance and the rotational stability of the rotor 13 can be maintained.

It can be appreciated that the balancing member 11 of the motor 1 according to the preferred teachings of the present invention can replace the base or substrate in conventional motors to support the stator 12 and the rotor 13. Furthermore, the balancing member 11 of the motor 1 according to the preferred teachings of the present invention can maintain rotational balance of the rotor 13. Thus, in contrast to the conventional motors requiring a balancing magnet, a balancing ring, or the like coupled to the base or substrate for maintaining stable rotation of the rotor, the motor 1 according to the preferred teachings of the present invention has simplified structure, enhanced assembling convenience, and reduced manufacturing costs and effectively reduces the overall axial length of the motor 1 to allow miniaturization of the motor 1. Since the magnetically conductive portion 113 is an annular ring protruding from the surface 111 of the balancing member 11 towards but spaced from the magnetically attracting face 134 of the permanent magnet 133, the balancing effect provided by the balancing member 11 is further enhanced. Thus, undesired wobbling and noise are further avoided during rotation of the rotor 13. Further, the annular ring also increases the structural strength of the balancing member 11 for supporting the stator 12 and the rotor 13.

Figure 7:
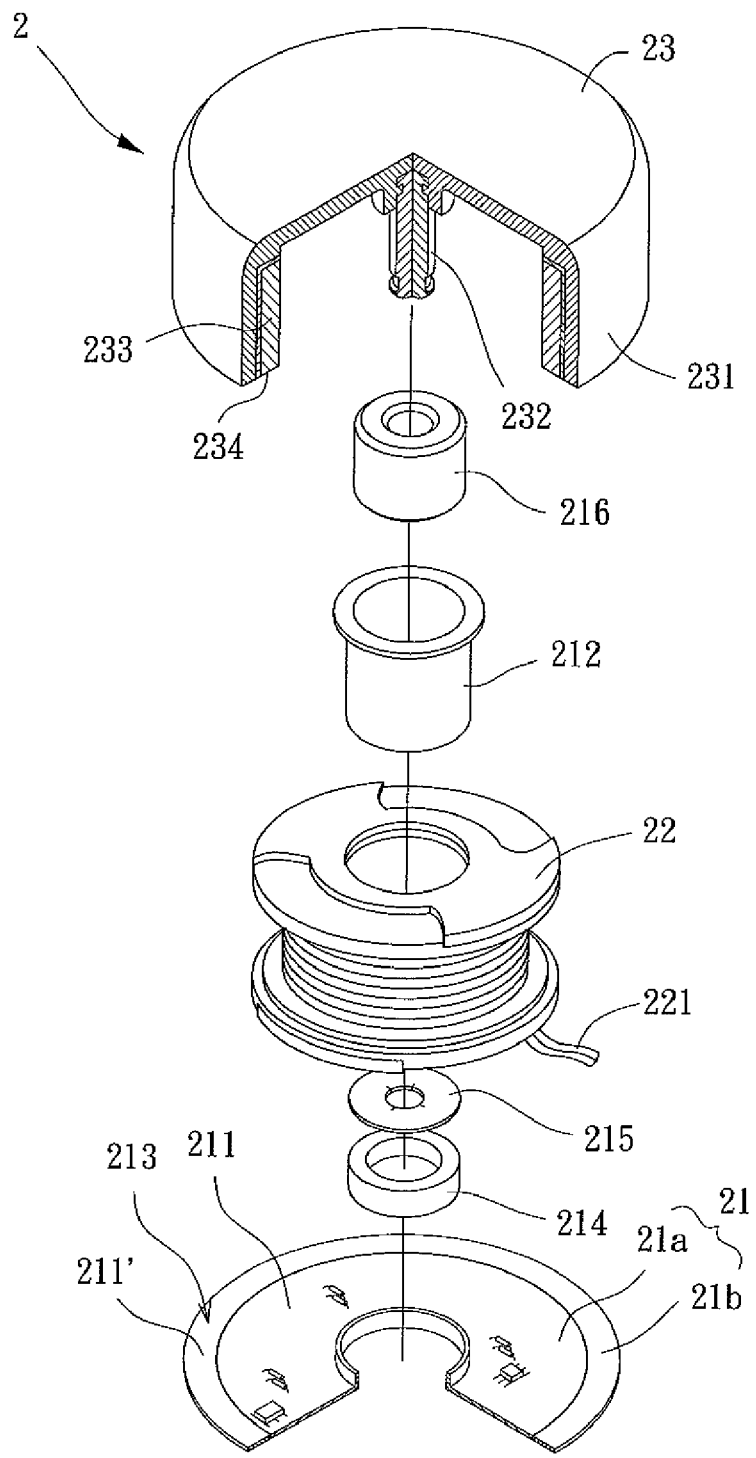
FIG. 7 shows an exploded, perspective view of a motor of a second embodiment according to the preferred teachings of the present invention with portions cut away.
Figure 8:
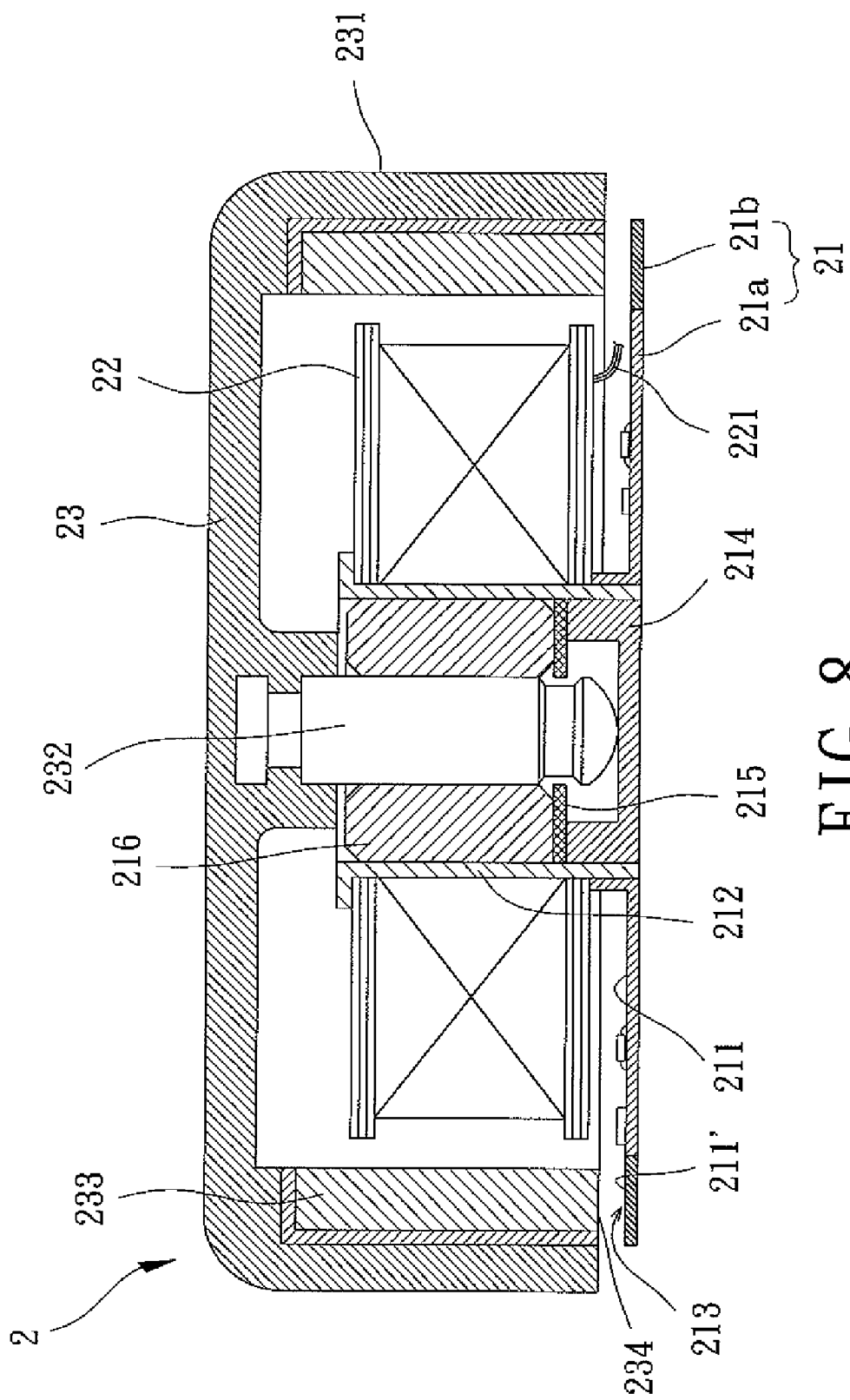
FIG. 8 shows a cross sectional view of the motor of FIG. 7.

A motor 2 of a second embodiment according to the preferred teachings of the present invention is shown in FIGS. 7 and 8. Specifically, the motor 2 includes a balancing member 21, a stator 22, and a rotor 23. The stator 22 and the rotor 23 are the same as the stator 12 and the rotor 13 in the first embodiment and therefore not described in detail to avoid redundancy. The stator 22 of the second embodiment also includes a wire 221. The rotor 23 also includes a hub 231, a shaft 232, a permanent magnet 233, and a magnetically attracting face 234.

The balancing member 21 of the second embodiment includes a circuit board 21a and a ring 21b electrically connected to the stator 22. The ring 21b is coupled to an outer periphery of the circuit board 21a. The ring 21b can be a magnet, a metal plate, etc. Each of the circuit board 21a and the ring 21b has a surface 211, 211'. The balancing member 21 is preferably coplanar to the surface 211' of the ring 21b. The surface 211 of the circuit board 21a has a shaft coupling portion 212 receiving an abrasion-resistant plate 214, a retaining plate 215, and a bearing 216. The surface 211' of the ring 21b is a magnetically conductive portion 213 in the form of a planar face aligned with the magnetically attracting face 234 of the rotor 23.

By replacing the base or substrate in conventional motors with the balancing member 21, the motor 2 of the second embodiment according to the preferred teachings of the present invention has simplified structure, enhanced assembling convenience, and reduced manufacturing costs. Furthermore, since the ring 21b is mounted to the outer periphery of the circuit board 21a and since the surface 211 of the circuit board 21a is coplanar to the surface 211' of the ring 21b, the overall axial length of the motor 2 can be further reduced.

Figure 9:
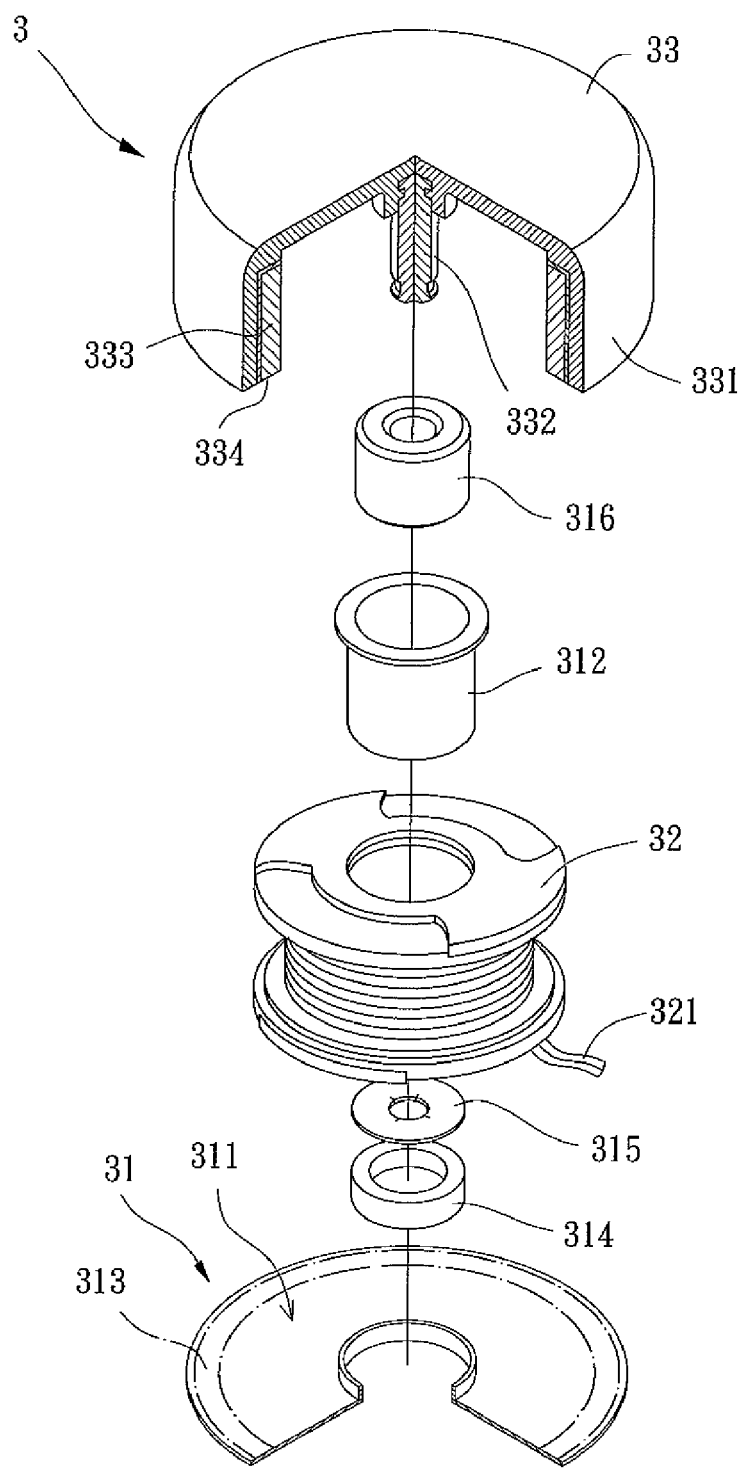
FIG. 9 shows an exploded, perspective view of a motor of a third embodiment according to the preferred teachings of the present invention with portions cut away.
Figure 10:
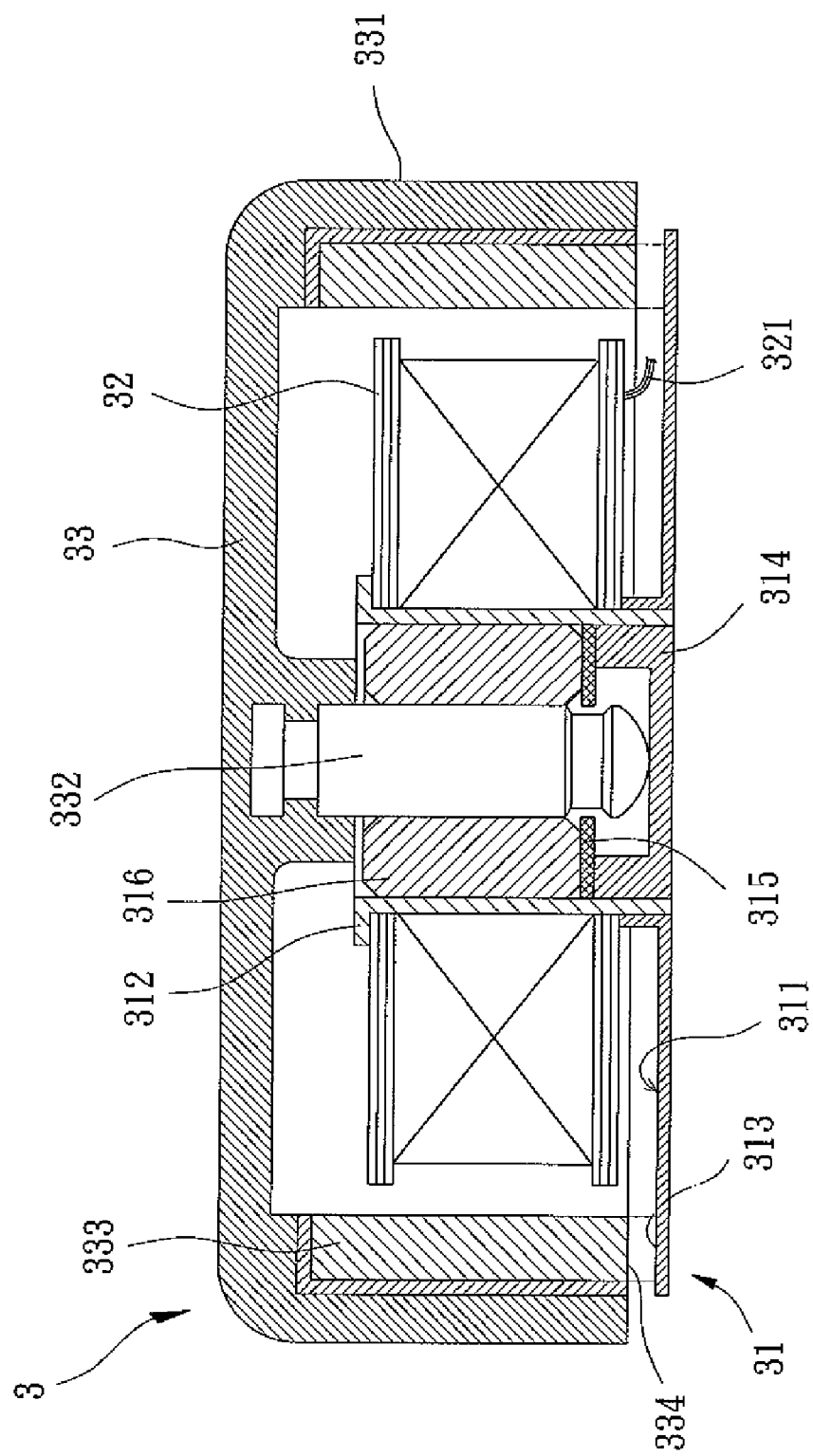
FIG. 10 shows a cross sectional view of the motor of FIG. 9.

A motor 3 of a third embodiment according to the preferred teachings of the present invention is shown in FIGS. 9 and 10. Specifically, the motor 3 includes a balancing member 31, a stator 32, and a rotor 33. The stator 32 and the rotor 33 are the same as the stator 12 and the rotor 13 in the first embodiment and therefore not described in detail to avoid redundancy. The stator 32 of the third embodiment also includes a wire 321. The rotor 33 also includes a hub 331, a shaft 332, a permanent magnet 333, and a magnetically attracting face 334.

The balancing member 31 of the third embodiment includes a surface 311, a shaft coupling portion 312 and a magnetically conductive portion 313. The shaft coupling portion 312 receives an abrasion-resistant plate 314, a retaining plate 315, and a bearing 316. The magnetically conductive portion 313 is aligned with the magnetically attracting face 334 of the rotor 33.

By replacing the base or substrate in conventional motors with the balancing member 31, the motor 3 of the third embodiment according to the preferred teachings of the present invention has simplified structure, enhanced assembling convenience, and reduced manufacturing costs. Furthermore, the balancing member 31 of the motor 3 of the third embodiment is more simplified than the balancing members 11 and 21 of the motors 1 and 2 in the first and second embodiments.

Figure 11:
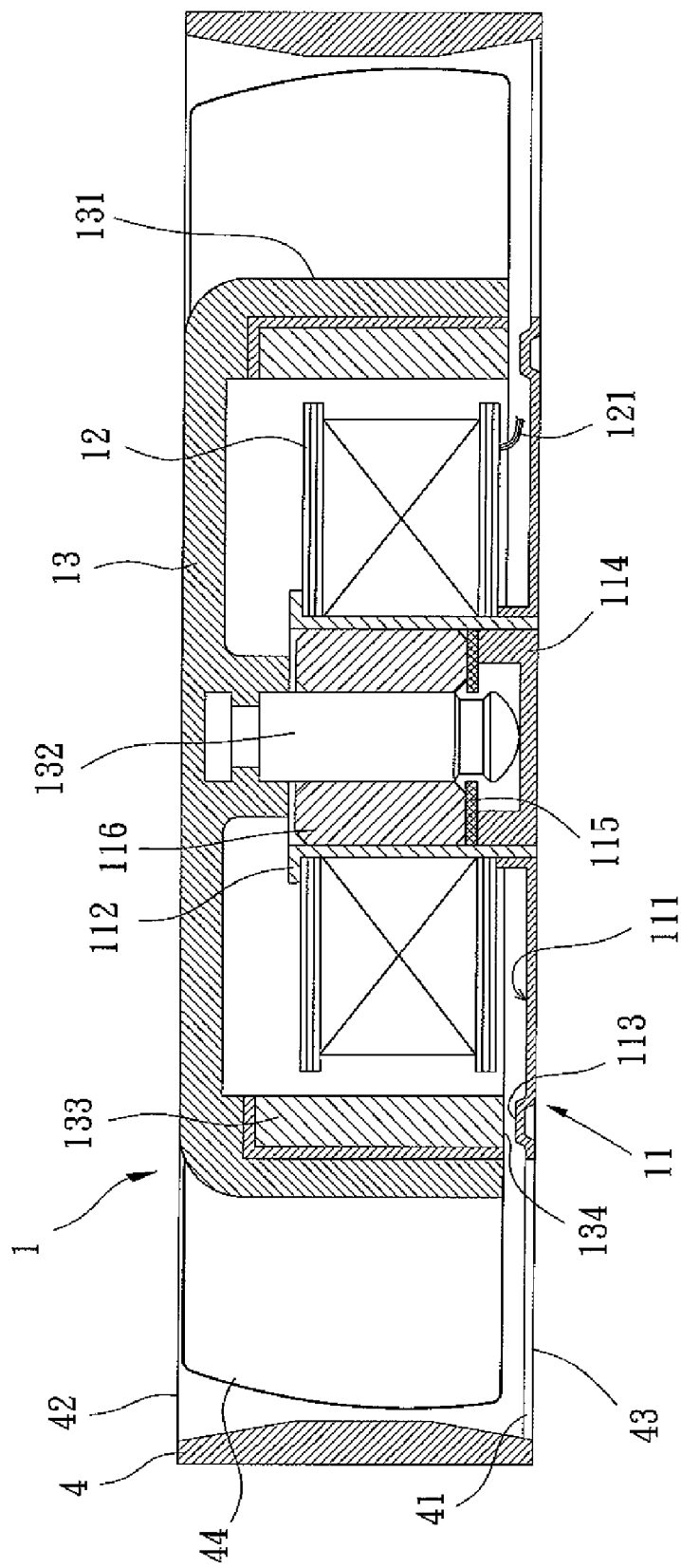
FIG. 11 shows a cross sectional view of a heat dissipating fan according to the preferred teachings of the present invention.

The motors 1, 2, and 3 of the first, second, and third embodiments according to the teachings of the present invention can be utilized in various heat dissipating fans. FIG. 11 shows a heat dissipating fan utilizing the motor 1 of the first embodiment. Specifically, the balancing member 11 is interconnected by a plurality of connecting members 41 to a housing 4 in which the balancing member 11 is mounted. The housing 4 includes an air inlet 42 and an air outlet 43. A plurality of blades 44 extends radially outward from the hub 131. The heat dissipating fan can be mounted in any electronic device or equipment. When the rotor 13 rotates, the blades 44 draw in air currents via the air inlet 42. The air currents exit the air outlet 43 to a heat source for heat dissipating purposes.

According to the above, in the motors 1, 2, and 3 and the heat dissipating fans including the motors 1, 2, and 3 according to the teachings of the present invention, the balancing member 11, 21, 31 directly replaces the base or substrate in conventional motors while maintains rotational balance for the rotor 13, 23, 33. Thus, in contrast to the conventional motors requiring a balancing magnet, a balancing ring, or the like coupled to the base or substrate for maintaining stable rotation of the rotor, the motor 1, 2, 3 according to the preferred teachings of the present invention has simplified structure, enhanced assembling convenience, and reduced manufacturing costs and effectively reduces the overall axial length of the motor 1, 2, 3.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor comprising:
    a balancing member including a circuit board and a ring coupled to an outer periphery of the circuit board, with each of the circuit board and the ring having a surface, with the balancing member further including a shaft coupling portion, with the surface of the ring being a plate made of magnetically conductive material;

a stator coupled to the balancing member and electrically connected to the circuit board; and a rotor including a hub, a shaft, and a permanent magnet, with the shaft and the permanent magnet mounted inside the hub, with the shaft rotatable coupled to the shaft coupling portion, with the permanent magnet including a magnetically attracting face aligned with the ring, with the surface of the circuit board facing the permanent magnet and being coplanar to the surface of the ring facing the permanent magnet.

2. The motor as claimed in claim 1, with the ring of the balancing member being a magnet or a metal plate.

3. A heat dissipating fan comprising:

a housing including an air inlet and an air outlet;

a balancing member located in the housing and interconnected by a plurality of connecting members to the housing, with the balancing member including a circuit board and a ring coupled to an outer periphery of the circuit board, with each of the circuit board and the ring having a surface, with the balancing member further including a shaft coupling portion, with the surface of the ring being a plate made of magnetically conductive material;

a stator coupled to the balancing member and electrically connected to the circuit board; and a rotor including a hub, a shaft, and a permanent magnet, with a plurality of blades extending outward from the hub, with the shaft and the permanent magnet mounted inside the hub, with the shaft rotatably coupled to the shaft coupling portion, with the permanent magnet including a magnetically attracting face aligned with the ring, with the surface of the circuit board facing the permanent magnet and coplanar to the surface of the ring facing the permanent magnet.

4. The heat dissipating fan as claimed in claim 3, with the ring of the balancing member being a magnet or a metal plate.

* * * * *